(12) United States Patent
Ishimori et al.

(10) Patent No.: US 12,103,332 B2
(45) Date of Patent: Oct. 1, 2024

(54) RETAINER FOR ANGULAR CONTACT BALL BEARING, ANGULAR CONTACT BALL BEARING, AND HUB UNIT BEARING

(71) Applicant: NSK Ltd., Tokyo (JP)

(72) Inventors: Yasuhiro Ishimori, Kanagawa (JP); Tatsuo Wakabayashi, Kanagawa (JP)

(73) Assignee: NSK LTD., Tokyo (JP)

( * ) Notice: Subject to any disclaimer, the term of this patent is extended or adjusted under 35 U.S.C. 154(b) by 205 days.

(21) Appl. No.: 17/777,702

(22) PCT Filed: Nov. 6, 2020

(86) PCT No.: PCT/JP2020/041580
§ 371 (c)(1),
(2) Date: May 18, 2022

(87) PCT Pub. No.: WO2021/100500
PCT Pub. Date: May 27, 2021

(65) Prior Publication Data
US 2023/0340990 A1    Oct. 26, 2023

(30) Foreign Application Priority Data
Nov. 19, 2019    (JP) ................................. 2019-208546

(51) Int. Cl.
*B60B 27/00*    (2006.01)
*F16C 19/18*    (2006.01)
*F16C 33/41*    (2006.01)

(52) U.S. Cl.
CPC ........ *B60B 27/0005* (2013.01); *F16C 19/186* (2013.01); *F16C 33/416* (2013.01);
(Continued)

(58) Field of Classification Search
CPC .. F16C 19/186; F16C 33/416; F16C 2326/02; F16C 19/181–187; F16C 33/41–418; B60B 27/0005; B60B 2380/30
See application file for complete search history.

(56) References Cited

U.S. PATENT DOCUMENTS

2017/0268570 A1* 9/2017 Kamamoto ........... F16C 33/416
2018/0100540 A1* 4/2018 Forster .................. F16C 33/585
(Continued)

FOREIGN PATENT DOCUMENTS

EP        193058 A  *  9/1986  ............ F16C 19/184
JP       46-000659 A     9/1971
(Continued)

OTHER PUBLICATIONS

European Search Report issued Oct. 23, 2023 in Application No. 20889544.1.
(Continued)

*Primary Examiner* — Alan B Waits
(74) *Attorney, Agent, or Firm* — Sughrue Mion, PLLC (57) ABSTRACT

A notch communicating a pair of pockets adjacent to each other in the circumferential direction of pockets of a retainer is provided in a range from an end section on the axially one side to the axially intermediate section of each of pillar portions of the retainer for an angular contact ball bearing, the notch having a substantially rectangular opening shape as seen from the circumferential direction, and an inner surface of the notch having an outer diameter side flat surface portion arranged on the radially outer side from the center of a pocket and extending substantially linearly in the axial direction, an inner diameter side flat surface portion arranged on the radially inner side from the center and extending substantially linearly in the axial direction, and a back side flat surface portion arranged on the axially other
(Continued)

side from the center and extending linearly in the radial direction.

3 Claims, 9 Drawing Sheets

(52) U.S. Cl.
CPC ........ *F16C 33/418* (2013.01); *B60B 2380/30* (2013.01); *F16C 2326/02* (2013.01)

(56) References Cited

U.S. PATENT DOCUMENTS

| | | | |
|---|---|---|---|
| 2020/0132119 A1* | 4/2020 | Engelen | F16C 19/18 |
| 2021/0094348 A1 | 4/2021 | Koizumi | |
| 2021/0140477 A1* | 5/2021 | Akimoto | F16C 19/16 |

FOREIGN PATENT DOCUMENTS

| | | |
|---|---|---|
| JP | 08-296650 A | 11/1996 |
| JP | 2008-064248 A | 3/2008 |
| JP | 2014-077508 A | 5/2014 |
| JP | 2017-125560 A | 7/2017 |
| JP | 2019-173966 A | 10/2019 |
| WO | 2006/027342 A1 | 3/2006 |
| WO | 2019/189421 A1 | 10/2019 |

OTHER PUBLICATIONS

International Search Report of PCT/JP2020/041580 dated Dec. 28, 2020 [PCT/ISA/210].

* cited by examiner

FIG. 1

AXIALLY OUTBOARD SIDE   AXIALLY INBOARD SIDE

FIG. 2

AXIALLY OTHER SIDE
(AXIALLY OUTBOARD SIDE)

AXIALLY ONE SIDE
(AXIALLY INBOARD SIDE)

AXIALLY OTHER SIDE    AXIALLY ONE SIDE

RETAINER FOR ANGULAR CONTACT BALL BEARING, ANGULAR CONTACT BALL BEARING, AND HUB UNIT BEARING

CROSS REFERENCE TO RELATED APPLICATIONS

This application is a National Stage of International Application No. PCT/JP2020/041580, filed Nov. 6, 2020, claiming priority to Japanese Patent Application No. 2019-208546, filed Nov. 19, 2019, the contents of which are incorporated in their entirety.

TECHNICAL FIELD

The present invention relates to a retainer for an angular contact ball bearing, an angular contact ball bearing with the retainer for an angular contact ball bearing, and a hub unit bearing with the angular contact ball bearing.

BACKGROUND ART

In an angular contact ball bearing, for example, as described in JP2014-077508A, a crown-shaped retainer for an angular contact ball bearing is used as a retainer for arranging a plurality of balls so as to be equally spaced in the circumferential direction and for holding each of the balls so as to be able to roll freely. The retainer for an angular contact ball bearing includes an annular rim portion, a plurality of pillar portions extending from a plurality of locations in the circumferential direction of the rim portion to axially one side, and a plurality of pockets for holding the balls, each of which is defined by a portion surrounded on three sides by a pair of pillar portions adjacent to each other in the circumferential direction and the rim portion.

Rolling bearings such as an angular contact ball bearing uses the following formula (1) representing the basic dynamic load rating Cr so as to obtain the load rating required for bearing selection.

$$Cr = b_m f_c (i \cos \alpha)^{0.7} Z^{2/3} Dw^{1.8} \qquad (1)$$

In the formula (1), $b_m$ and $f_c$ are constants determined by the material, shape, and manufacturing quality of the bearing, i is the number of rows of rolling elements in one bearing, $\alpha$ is the contact angle, Z is the number of rolling elements included in a row, and Dw is the diameter of the rolling elements.

According to the formula (1), by increasing the number of balls (Z) included in a row, it is possible to improve the basic dynamic load rating Cr of an angular contact ball bearing, and to extend the bearing life.

Figure 8:
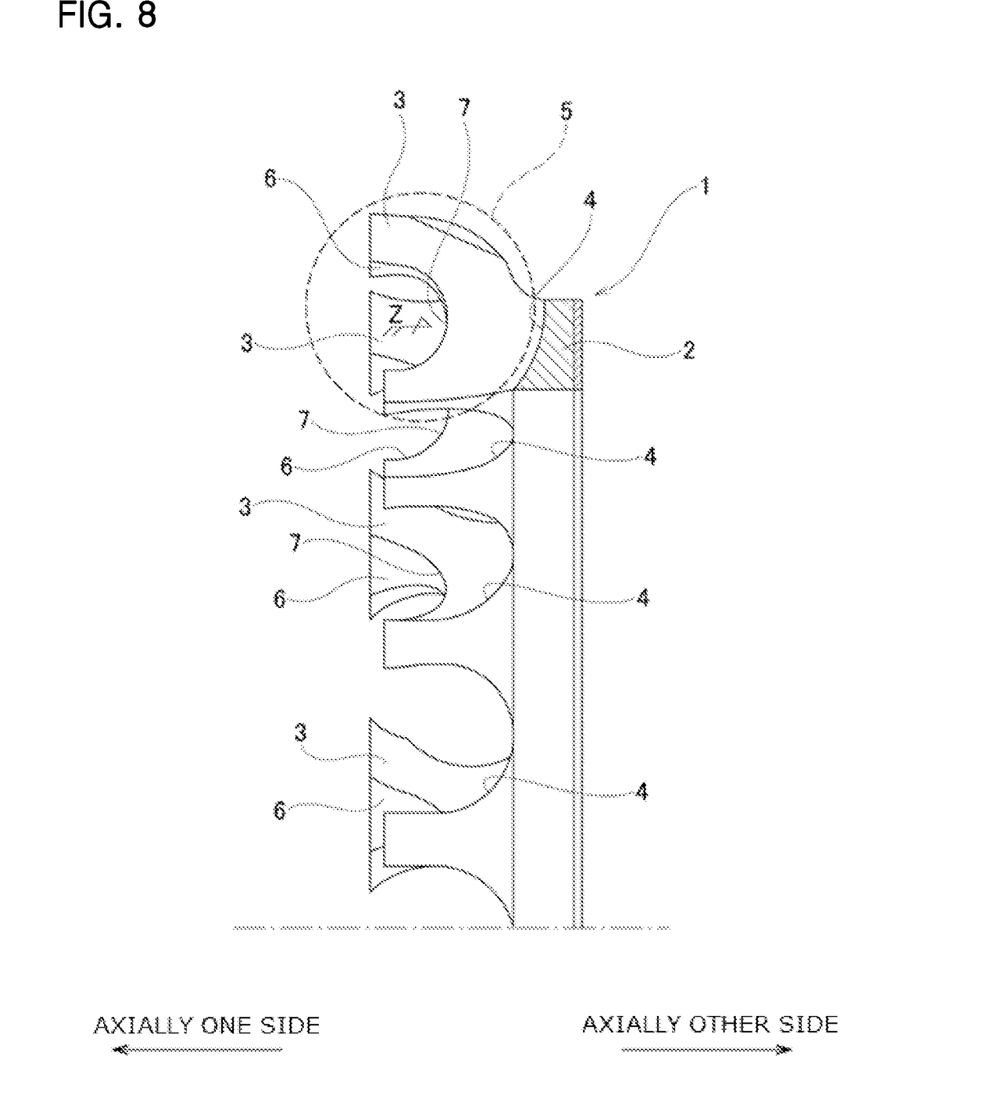
FIG. 8 is a half cross-sectional view of a retainer for an angular contact ball bearing having a conventional structure.

In view of such circumstances, for example, WO2006/027342(A1) discloses a retainer for an angular contact ball bearing having a structure capable of increasing the number of balls included in a row. FIG. 8 illustrates a retainer 1 for an angular contact ball bearing having a conventional structure described in WO2006/027342(A1).

The retainer 1 for an angular contact ball bearing includes an annular rim portion 2, a plurality of pillar portions 3, and a plurality of pockets 4. Each of the plurality of pillar portions 3 has concave curved side surfaces in the circumferential direction and extends from a plurality of locations in the circumferential direction of the rim portion 2 to axially one side (left side in FIG. 8). Each of the plurality of pockets 4 is defined by a portion surrounded on three sides by a pair of pillar portions 3 adjacent to each other in the circumferential direction and the rim portion 2 to hold a ball 5 so as to be able to roll freely.

The retainer 1 for an angular contact ball bearing having a conventional structure includes notches 6, that communicate the pockets 4 adjacent to each other in the circumferential direction, in a range from end sections on the axially one side to the axially intermediate sections of the pillar portions 3. As a result, the distance between the balls 5 adjacent to each other in the circumferential direction can be shortened as compared with the structure having no notches in the pillar portions. Accordingly, the number of balls 5 that can be held by the retainer 1 for an angular contact ball bearing can be increased, and the basic dynamic load rating Cr of the angular contact ball bearing can be improved.

CITATION LIST

Patent Literature

[Patent Literature 1] JP2014-077508A
[Patent Literature 2] WO2006/027342(A1)

SUMMARY OF INVENTION

Technical Problem

However, the retainer 1 for an angular contact ball bearing having a conventional structure described in WO2006/027342(A1) has room for improvement from the aspect of further shortening the circumferential distance between the balls 5 (pockets 4) adjacent to each other in the circumferential direction.

Figure 9:
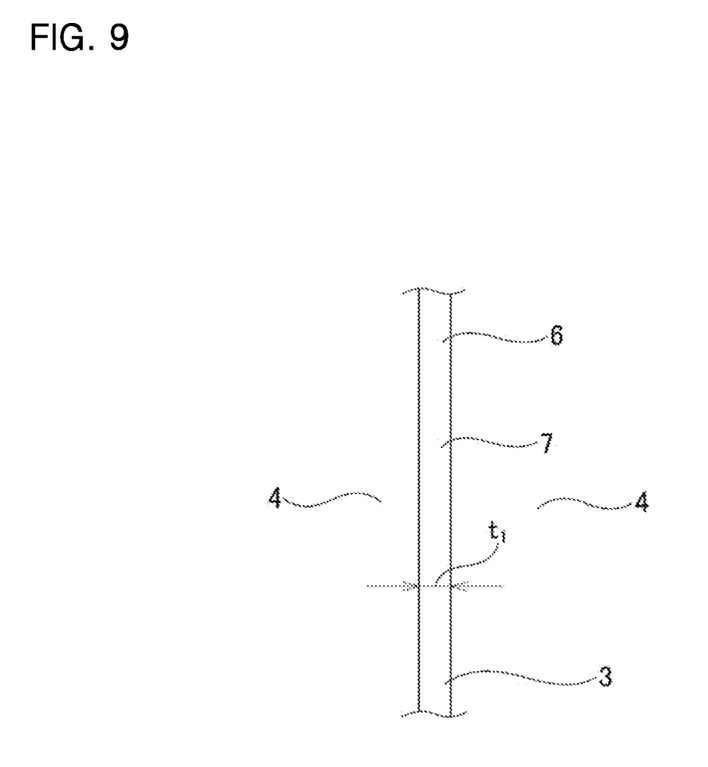
FIG. 9 is a schematic view corresponding to a view as seen from the arrow Z in FIG. 9.

That is, in the retainer 1 for an angular contact ball bearing having a conventional structure, of the inner surface of a notch 6, half portion on the axially other side (rim portion 2 side) is configured by a curved surface portion 7 having a semicircular arc shape. Therefore, as illustrated in FIG. 9 which corresponds to a view as seen from the arrow Z in FIG. 8, the thickness in the circumferential direction of the pillar portions 3 is constant over the entire range of the curved surfaces portion 7, and thus become a minimum thickness portion (thickness $t^1$) of each of the pillar portions 3. In other words, the minimum thickness portion of the pillar portion 3 exists continuously in a semicircular arc shape along the curved surface portion 7. Further, the thickness in the circumferential direction of the pillar portion 3 increases as the distance from the curved surface portion 7 increases, and the thickness of the portions existing on the radially outer side of the curved surface portion 7 increases remarkably.

When the retainer 1 for an angular contact ball bearing having such a structure is manufactured by injection molding of synthetic resin, it becomes difficult to improve the accuracy of the notches 6 due to, for example, the difference in solidification timing caused by the difference in thickness. Specifically, in the pillar portions 3, the change in thickness of the portions existing around the curved surface portions 7 (the minimum thickness portions) is not constant and the thin portions solidify faster than the thick portions, so that the force acting on the curved surface portions 7 becomes non-uniform when the portions existing around the curved surface portions 7 solidify after the curved surface portions 7 are solidified. Therefore, non-uniform deformation such as wrinkles tends to occur on the curved surface portions 7, and the accuracy of the notches 6, as well as the strength and rigidity of the curved surface portions 7 tend to deteriorate.

Deterioration in the accuracy of the notches 6 and deterioration in the strength and rigidity of the curved surface portions 7 may cause contact between the balls 5, generation of abnormal noise, reduction in bearing life, and the like. For this kind of reason, in the retainer 1 for an angular contact ball bearing having a conventional structure, it is necessary to make the thickness of the curved surface portions 7 thicker (with a margin) than the minimum thickness required for injection molding.

The present invention has been made in order to solve the problems described above, and an object of the present invention is to provide a retainer for an angular contact ball bearing having a structure capable of sufficiently shortening the circumferential distance between pockets adjacent to each other in the circumferential direction and increasing the number of balls that can be held.

Solution to Problem

A retainer for an angular contact ball bearing according to one aspect of the present invention includes an annular rim portion, a plurality of pillar portions, and a plurality of pockets.

The plurality of pillar portions extends from a plurality of locations in the circumferential direction of the rim portion to an axially one side, and each of the plurality of pillar portions has concave curved side surfaces in the circumferential direction.

Each of the plurality of pockets is defined by a portion surrounded on three sides by a pair of pillar portions adjacent to each other in the circumferential direction of the plurality of pillar portions and the rim portion.

Each of the pillar portions has a notch in a range extending from an end section on the axially one side to the axially intermediate section that communicates a pair of pockets adjacent to each other in the circumferential direction of the plurality of pockets.

Each of the notches has a substantially rectangular opening shape as seen from the circumferential direction. The inner surface of each of the notches has an outer diameter side flat surface portion arranged on a radially outer side from the center of each of the pockets and extends substantially linearly in an axial direction, an inner diameter side flat surface portion arranged on a radially inner side from the center of each of the pockets and extends substantially linearly in the axial direction, and a back side flat surface portion arranged on an axially other side from the center of each of the pockets and extends linearly in a radial direction.

The angular contact ball bearing according to one aspect of the present invention includes an outer ring member having an angular type outer-raceway on the inner circumferential surface, an inner ring member having an angular type inner-raceway on the outer-circumferential surface, a plurality of balls arranged between the outer-raceway and the inner-raceway, and a retainer having a plurality of pockets and holding each of the plurality of balls in each of the plurality of pockets so as to be able to roll freely, and the retainer is configured by the retainer for an angular contact ball bearing according to one aspect of the present invention.

The hub unit bearing according to one aspect of the present invention is a hub unit bearing for supporting a wheel of an automobile with respect to a suspension device so as to be able to rotate freely, and includes a double-row angular contact ball bearing, and an angular contact ball bearing of each row of the double-row angular contact ball bearing is configured by the angular contact ball bearing according to one aspect of the present invention.

Advantageous Effects of Invention

In the retainer for an angular contact ball bearing according to one aspect of the present invention, and in an angular contact ball bearing and a hub unit bearing to which the retainer for an angular contact ball bearing is applied, the circumferential distance between the pockets adjacent to each other in the circumferential direction can be sufficiently shortened and the number of the balls that can be held can be increased without deteriorating the accuracy of the notches provided in the retainer and without impairing the strength and rigidity of the retainer.

DESCRIPTION OF THE EMBODIMENTS

First Example

A first example of an embodiment of the present invention will be described with reference to FIGS. 1 to 7.

In this example, an angular contact ball bearing having retainers for an angular contact ball bearing is applied to a hub unit bearing (double-row angular contact ball bearing) for rotatably supporting a wheel of an automobile with respect to the suspension device.

The hub unit bearing 8 of this example is an inner ring rotation type and is a so-called third-generation hub unit bearing for a driven wheel. The hub unit bearing 8 includes an outer ring 9 corresponding to an outer ring member, a hub 10 corresponding to an inner ring member, a plurality of balls 11, and a pair of retainers 12 for an angular contact ball bearing.

Figure 1:
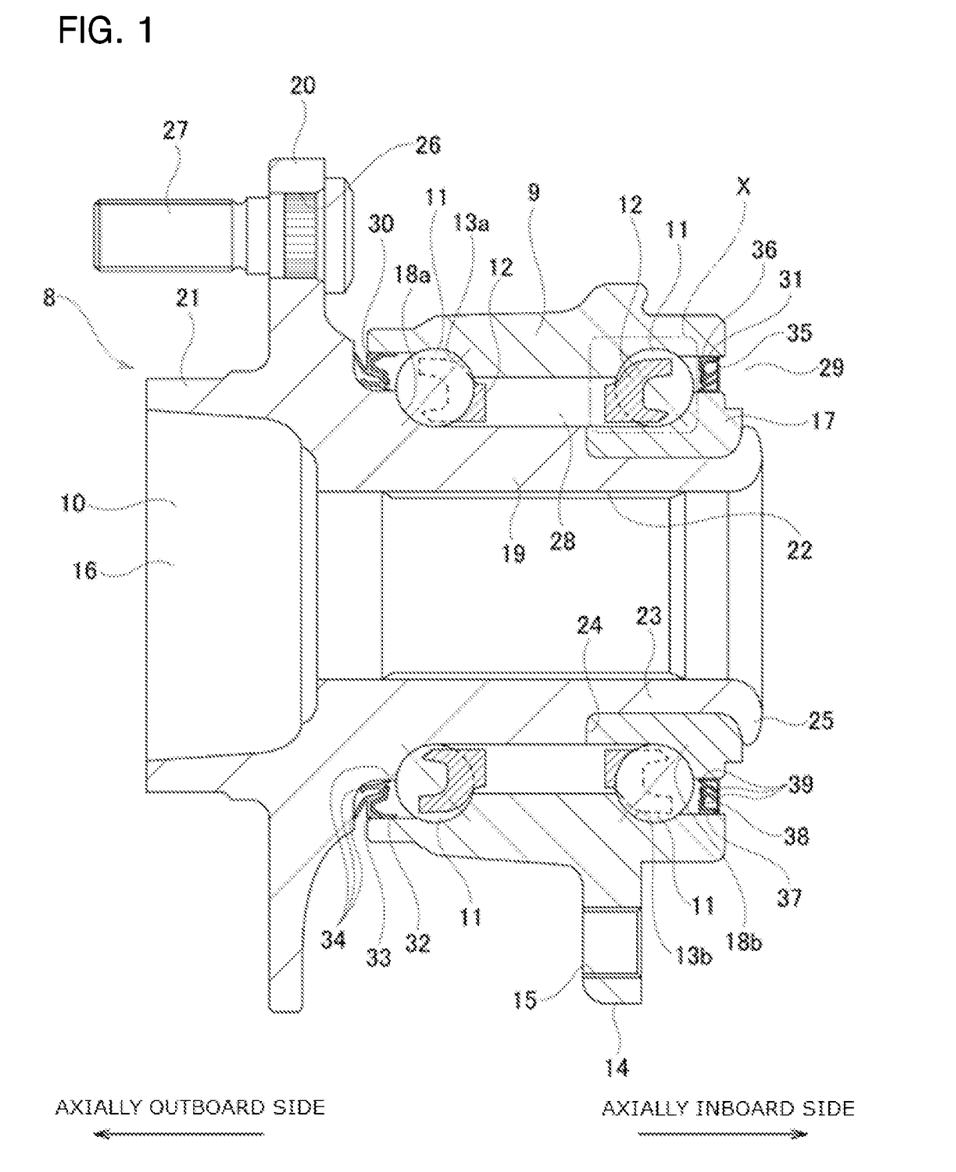
FIG. 1 is a cross-sectional view illustrating a hub unit bearing according to a first example of an embodiment of the present invention.
Figure 2:
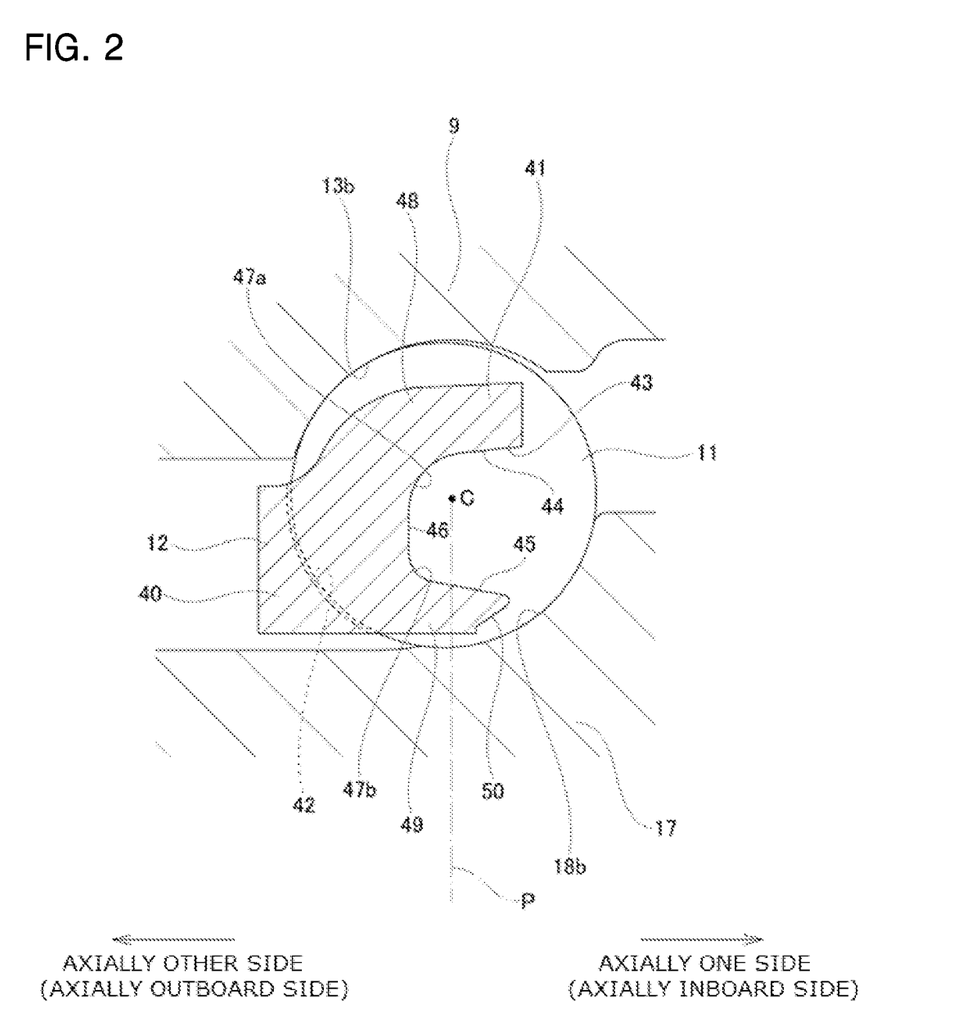
FIG. 2 is an enlarged view of part X in FIG. 1.
Figure 3:
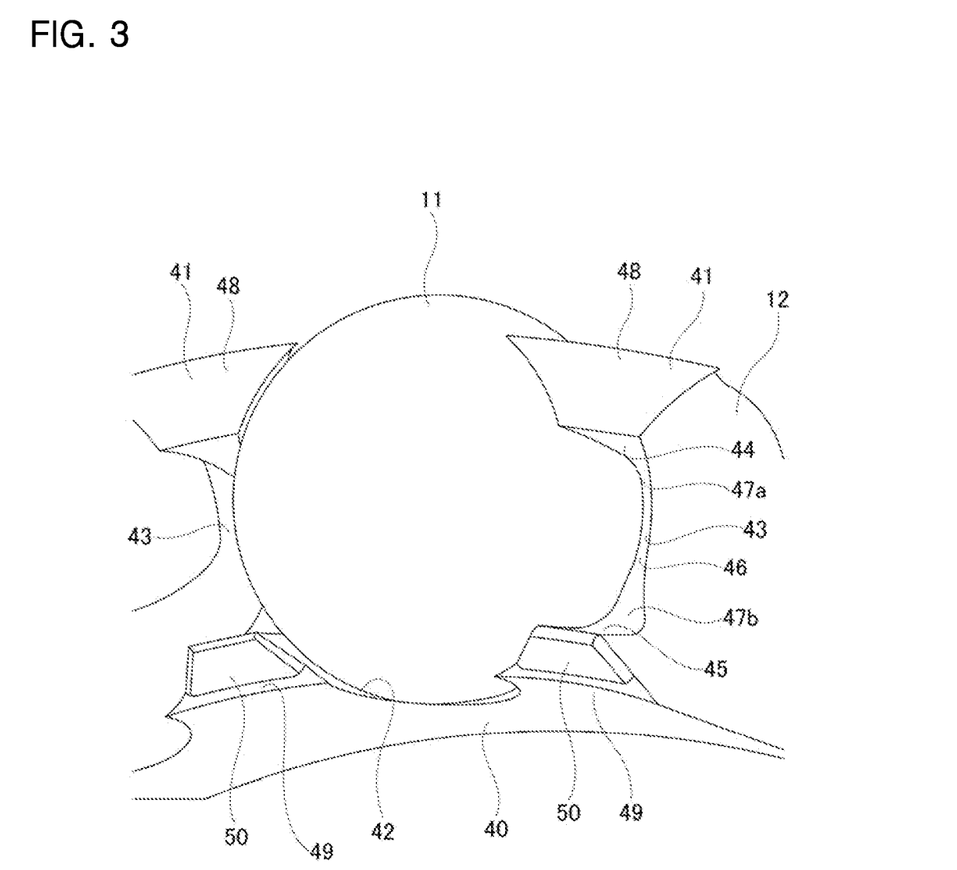
FIG. 3 is a partially enlarged perspective view illustrating a retainer for an angular contact ball bearing of the hub unit bearing of the first example in a state where the balls are held in pockets.
Figure 4:
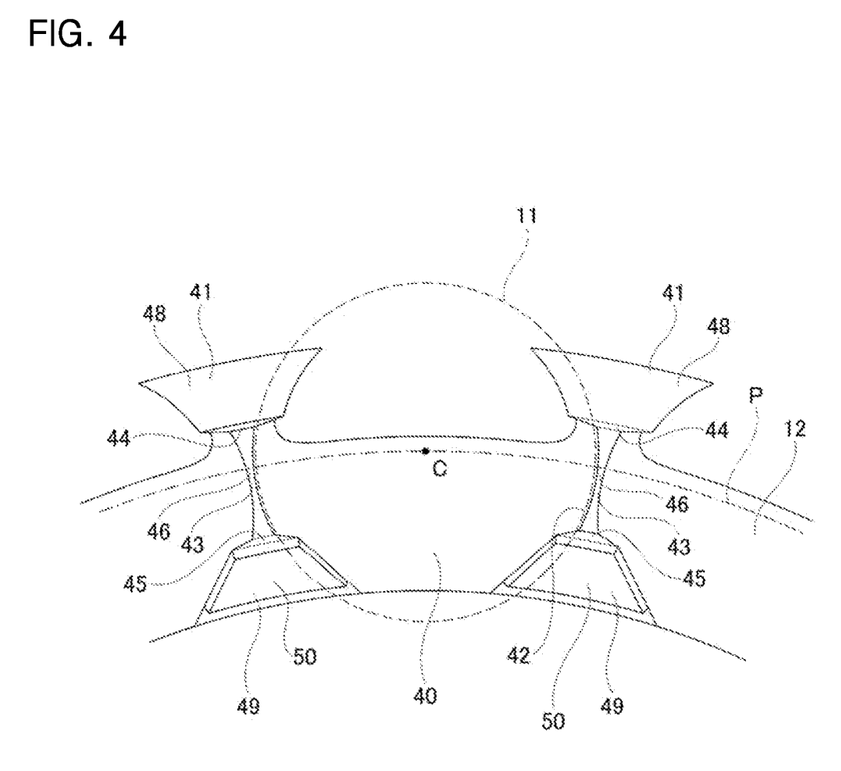
FIG. 4. is a partially enlarged perspective view illustrating a retainer for an angular contact ball bearing of the first example as seen from axially one side in a state where the balls are held in the pockets.
Figure 5:
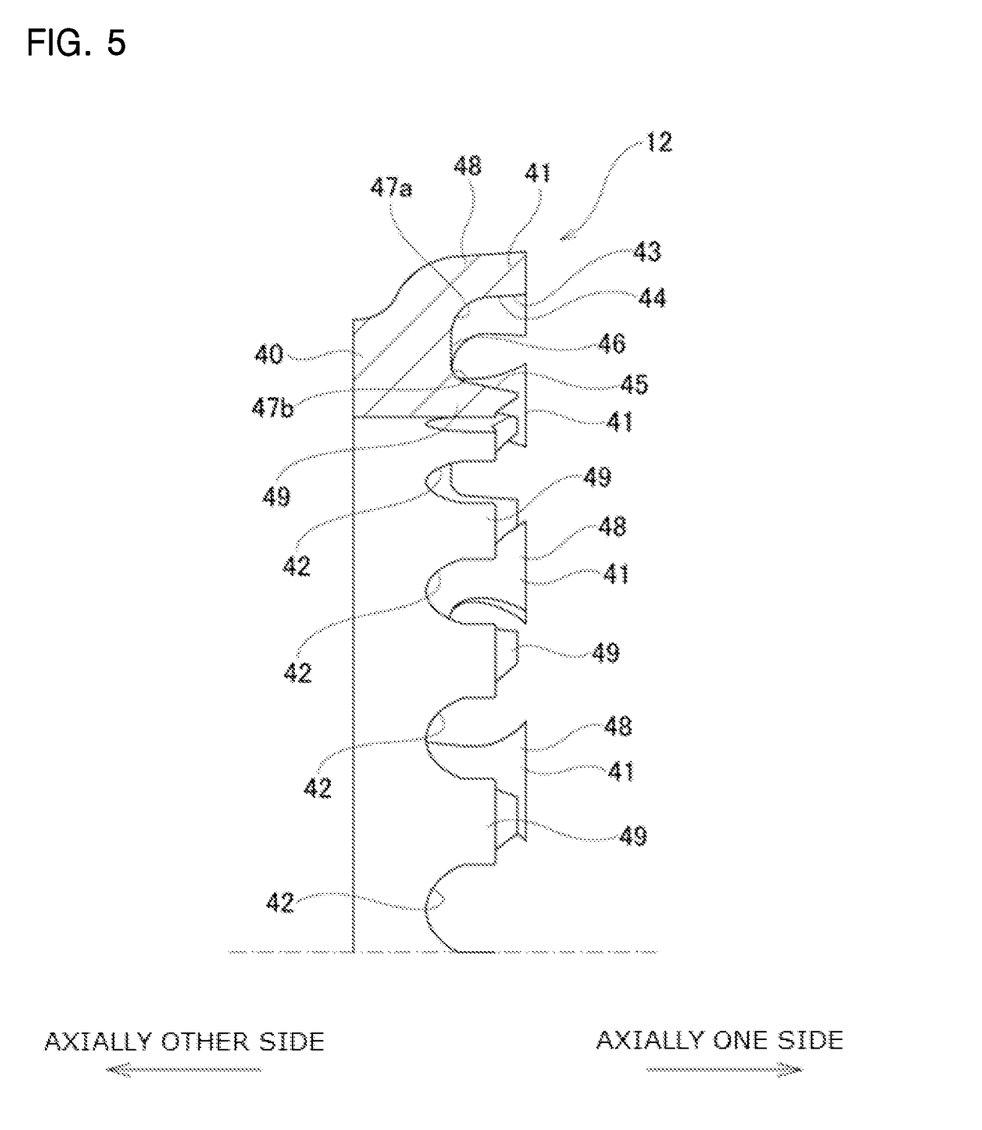
FIG. 5. is a half cross-sectional view illustrating a retainer for an angular contact ball bearing of the first example.

Regarding the hub unit bearing 8, the axially outboard side is the left side in FIGS. 1 to 2 which is the outside in the width direction of the vehicle when assembled to the vehicle, and the axially inboard side is the right side in FIGS. 1 to 2 which is the center side in the width direction of the vehicle when assembled to the vehicle.

The outer ring 9 is made of medium carbon steel such as S53C and has a substantially cylindrical shape. The outer ring 9 has angular type double-row outer-raceways 13a, 13b on the inner circumferential surface, and has a stationary flange 14 protruding toward the radially outer side at the axially intermediate section of the outer-circumferential surface. The stationary flange 14 has support holes 15 that penetrate in the axial direction at a plurality of locations in the circumferential direction. The outer ring 9 is supported by and fastened to the suspension device by bolts inserted into the support holes 15, and does not rotate even when a wheel rotates.

The hub 10 is coaxially arranged with the outer ring 9 on the radially inner side of the outer ring 9, and is formed by combining a hub spindle 16 made of medium carbon steel such as S53C and an inner ring 17 made of high carbon chrome steel such as SUJ2. The hub 10 has angular type double-row inner-raceways 18a, 18b in portions of the outer-circumferential surface facing the double-row outer-raceways 13a, 13b.

The hub spindle 16 is a shaft member onto which the inner ring 17 is externally fitted and held, and has a shaft section 19, a rotating flange 20, and a pilot section 21. In this example, since the hub unit bearing 8 is for a driven wheel, the hub spindle 16 has a spline hole 22 penetrating in the axial direction at the center section thereof. The spline hole 22 and a drive shaft are engaged by spline engagement. The drive shaft is rotationally driven directly by a driving source such as an engine or electric motor, or is rotationally driven thereby through a transmission. While driving the automobile, the hub 10 is rotationally driven by the drive shaft so as to rotationally drive a wheel and a brake rotating body that are joined and fastened to the rotating flange 20 of the hub 10. However, when the present invention is applied to a hub unit bearing for a non-driven wheel, a solid hub spindle can be used.

The shaft section 19 is provided in a range extending from the axially inboard side portion to the axially intermediate section of the hub spindle 16. The shaft section 19 has a small diameter portion 23 on the axially inboard side portion, which has a smaller outer diameter than the portion adjacent to the axially outboard side and to which the inner ring 17 is externally fitted, and has an inner-raceway 18a in the outer row on the outer-circumferential surface of the axially intermediate section. The shaft section 19 further has a stepped surface 24 facing the axially inboard side on the outer-circumferential surface of the axially intermediate section adjacent to the axially outboard side of the small diameter portion 23. The small diameter portion 23 has a swaged portion 25 at the end section of the axially inboard side, which is bent toward the radially outer side and presses the end surface on the axially inboard side of the inner ring 17.

The rotating flange 20 is provided in a portion of the hub spindle 16 located axially outboard side from the end section of the axially outboard side of the outer ring 9, and has a substantially circular ring shape. The rotating flange 20 has installation holes 26 penetrating in the axial direction at a plurality of locations in the circumferential direction in the radially intermediate section. A stud 27 is press fitted into each of the installation holes 26. A nut (not illustrated) is screwed into the tip-end section of the stud 27. As a result, the wheel and the brake rotating body are fastened to the axially outboard side of the rotating flange 20. In a case of implementing the present invention, the wheel and the brake rotating body can be fastened to the axially outboard side of the rotating flange by forming a female screw hole in the rotating flange and directly screwing a hub bolt into the female screw hole.

The pilot section 21 is for externally fitting the wheel and the brake rotating body with a loose fit without any looseness, and is provided at an end section on the axially outboard side of the hub spindle 16 and has a substantially cylindrical shape.

The inner ring 17 has an annular shape, and has an inner-raceway 18b of the inner row on the outer-circumferential surface. The inner ring 17 is externally fitted to the small diameter portion 23 provided in the shaft section 19 by an interference fit, and is held on both sides in the axial direction between the stepped surface 24 and the swaged portion 25.

The balls 11 are made of high carbon chrome steel or ceramic, and a plurality of balls are arranged in each row between the double-row outer-raceways 13a, 13b and the double-row inner-raceways 18a, 18b so as to be separated in the circumferential direction, and the balls 11 are rotatably held by the retainers 12 for an angular contact ball bearing in each row. In this state, the balls arranged in double-row are provided with a back-to-back arrangement type (DB type) contact angle. In this example, the pitch circle diameter of the balls 11 in the row on the axially inboard side and the pitch circle diameter of the balls 11 in the row on the axially outboard side are the same as each other, however, the present invention can also be applied to a PCD type hub unit bearing having different diameters in which the pitch circle diameter of the balls in the row on the axially inboard side and the pitch circle diameter of the balls in the row on the axially outboard side are different from each other.

Grease (not illustrated) is packed in an annular internal space 28 that exists between the inner circumferential surface of the outer ring 9 and the outer-circumferential surface of the hub 10, and a plurality of balls 11 are installed therein. In order to prevent the grease packed in the internal space 28 from leakage to the external space 29 and to prevent foreign matter such as mud slurry from entering the internal space 28 from the external space 29, the opening on the axially outboard side of the internal space 28 is closed by an outer sealing member 30, and the opening on the axially inboard side of the internal space 28 is closed by an inner sealing member 31.

The outer sealing member 30 includes an outer metal insert 32 and an outer sealing member 33.

The outer metal insert 32 is manufactured by stamping a metal plate such as a cold-rolled steel plate, has a substantially L-shaped cross-sectional shape, and has a cylindrical shape as a whole. The outer metal insert 32 is tightly fitted inside the end section on the axially outboard side of the outer ring 9.

The outer sealing member 33 is made of an elastic material such as acrylonitrile butadiene rubber (NBR), and is fastened to the surface of the outer metal insert 32 over the entire circumference. The outer sealing member 33 has at least one (three in the illustrated example) seal lip 34. The tip-end section of the seal lip 34 comes in sliding contact with the outer-circumferential surface of the shaft section 19 or the inner side surface in the axial direction of the rotating flange 20 over the entire circumference.

The inner sealing member 31 includes a slinger 35 and a seal ring 36.

The slinger 35 is made by stamping a metal plate such as a stainless-steel plate or a cold-rolled steel plate (SPCC) that has been subjected to rust-preventive treatment, has an L-shaped cross-sectional shape, and has an annular shape as a whole. The slinger 35 is externally fitted and fastened to the end section on the axially inboard side of the inner ring 17. It is also possible to attach an encoder used for detecting the rotational speed of a wheel to the axially inner side surface of the slinger 35.

The seal ring 36 includes a metal insert 37 and a seal member 38.

The metal insert 37 is made by stamping a metal plate such as a cold-rolled steel plate, has a substantially L-shaped cross-sectional shape, and has an annular shape as a whole. The metal insert 37 is tightly fitted inside the end section on the axially inboard side of the outer ring 9.

The seal member 38 is made of an elastic material such as an acrylonitrile butadiene rubber (NBR), and is fastened to the surface of the metal insert 37 over the entire circumference. The seal member 38 has a plurality of (three in the illustrated example) seal lips 39. The tip-end sections of the seal lips 39 come in contact with or close to the surface of the slinger 35 over the entire circumference.

Next, the retainer 12 for an angular contact ball bearing of this example will be described in detail in reference to FIGS. 2 to 7. Regarding the retainer 12 for an angular contact ball bearing, the axial direction, the radial direction, and the circumferential direction correspond to the axial direction, the radial direction, and the circumferential direction regarding a rim portion 40, which will be explained later, of the retainer 12 for an angular contact ball bearing unless specified otherwise.

A retainer 12 for an angular contact ball bearing is a crown-shaped retainer that is integrally manufactured by injection molding synthetic resin, and includes a rim portion 40, a plurality of pillar portions 41, and a plurality of pockets 42.

As the synthetic resin of the retainer 12 for an angular contact ball bearing, in addition to polyamide 66 (PA66), various synthetic resins such as polyamide 6 (PA6), polyamide 46 (PA46), polyamide 9T (PA9T), polyphenylene sulfide (PPS), polyethylene terephthalate (PET), polyacetal (POM), and phenol resin (PF) can be employed. Various reinforcing fibers such as glass fiber, polyethylene fiber, carbon fiber, and aramid fiber can be mixed with these synthetic resins, when necessary.

The rim portion 40 is formed in an annular shape. The rim portion 40 has a cylindrical inner circumferential surface, and has an inner diameter slightly larger than the outer diameter of the axially intermediate section of the shaft section 19 of the hub spindle 16 and the outer diameter of the axially outside portion of the inner ring 17. Further, the rim portion 40 has a cylindrical outer-circumferential surface, and has an outer diameter smaller than the inner diameter of the axially intermediate section of the outer ring 9. Pillar portions 41 are arranged on the side surface of the axially one side of the rim portion 40 so as to be equally spaced in the circumferential direction. Of the side surface of the one side in the axial direction of the rim portion 40, portions deviating from the pillar portions 41 in the circumferential direction are respectively formed in a concave curved surface. The side surface on the axially other side of the rim portion 40 is a flat surface existing on an imaginary flat plane orthogonal to the center axis of the rim portion 40.

Regarding the retainers 12 for an angular contact ball bearing, the axially one side is the right side for the retainer 12 for an angular contact ball bearing on the right-side row in FIG. 1, and is the left side for the retainer 12 for an angular contact ball bearing on the left-side row in FIG. 1. Further, regarding the retainers 12 for an angular contact ball bearing, the axially other side is the left side for the retainer 12 for an angular contact ball bearing on the right-side row in FIG. 1, and is the right side for the retainer 12 for an angular contact ball bearing on the left-side row in FIG. 1.

Each of the plurality of pillar portions 41 has concave curved side surfaces in the circumferential direction, and extends to the axially one side from a plurality of locations that are equally spaced in the circumferential direction of the rim portion 40. The radially inner side surfaces of the pillar portions 41 extend from the inner circumferential surface of the rim portion 40 to the axially one side, and exist on the same imaginary cylindrical surface as the inner circumferential surface of the rim portion 40 except for the end sections on the axially one side. The radially outer side surfaces of the pillar portions 41 have the axially other side portions respectively having a substantially arcuate cross-sectional shape extending radially outward as going toward the axially one side, and have the axially one side portions arranged substantially parallel to the center axis of the rim portion 40. Therefore, the width in the radial direction of the axially other side portions of the pillar portions 41 becomes larger toward the axially one side.

Each of the plurality of pockets 42 is a portion that holds a ball 11 so as to be able to roll freely, and is defined by a portion surrounded on three sides by a pair of pillar portions 41 that are adjacent to each other in the circumferential direction and the rim portion 40. The inner surface of the pocket 42 is formed so as to be a partially spherical concave surface or a partially cylindrical concave surface by side surfaces in the circumferential direction of a pair of pillar portions 41, the side surface facing to each other in the circumferential direction and each having a concave curved surface, and a concave curved side surface on the axially one side of the rim portion 40, and has a radius of curvature slightly larger than the radius of curvature of a rolling contact surface of a ball 11. The center C of the pocket 42 substantially coincides with the center of the ball 11 held in the pocket 42.

The side surfaces in the circumferential direction of the pillar portions 41 are curved so as to protrude inward of the pocket 42 from the radially intermediate section (center section) as going toward the radially both sides. As a result, the distance between the side surfaces in the circumferential direction of a pair of pillar portions 41 adjacent to each other in the circumferential direction (opening width of the pocket 42) is smaller than the diameter of the ball 11 at the end section on the radially outer side and at the end section on the radially inner side of the pillar portions 41. Therefore, the balls 11 are prevented from coming out from the inside of the pockets 42 to the radially outer side and to the radially inner side.

The side surfaces in the circumferential direction of the pillar portions 41 are curved so as to protrude inward of the pocket 42 from the axially intermediate section as going toward the axially both sides. As a result, the distance between the side surfaces in the circumferential direction of a pair of pillar portions 41 adjacent to each other in the circumferential direction is smaller than the diameter of the ball 11 at the end section on the axially one side and at the end section on the axially other side of the pillar portions 41. Therefore, the balls 11 are prevented from coming out from the inside of the pockets 42 to the axially one side.

The work of inserting the balls 11 into the pockets 42 is performed by elastically expanding the distance between the end sections on the axially one side of a pair of pillar portions 41 adjacent to each other in the circumferential direction and pushing the balls 11 into the pockets 42.

The circumferential distance between the balls 11 adjacent to each other in the circumferential direction is the smallest on the pitch circle P of the balls 11. Therefore, if the thickness in the circumferential direction of a portion of the pillar portion 41 where the pitch circle P passes is reduced, the circumferential distance between the balls 11 adjacent to each other in the circumferential direction can be shortened. In this example, the thickness in the circumferential direction of the pillar portion 41 is reduced, and a notch 43 which communicates the pockets 42 adjacent to each other in the circumferential direction is formed in a range of the pillar portion 41 from the end section on the axially one side to the axially intermediate section including the portion where the pitch circle P of the balls 11 passes. In other words, the notches 43 are formed by removing the portions of the pillar portions 41 where the pitch circle P of the balls 11 passes and their peripheral portions that are less than or equal to the minimum thickness required for injection molding of the retainers 12 for an angular contact ball bearing.

Each of the notches 43 is open on the end surface of the axially one side and the axially both side surfaces of the pillar portions 41, and has a substantially rectangular opening shape as seen from the circumferential direction. The inner surface of each of the notches 43 is U-shaped, and includes an outer diameter side flat surface portion 44, an inner diameter side flat surface portion, a back side flat surface portion 46, and a pair of curved surfaces 47a, 47b.

The outer diameter side flat surface portion 44 constitutes a side surface on the radially outer side of the inner surface of the notch 43, is arranged radially outer side from the center C (pitch circle P) of the pocket 42, and extends substantially linearly in the axial direction. The outer diameter side flat surface portion 44 is slightly inclined in the radially-outward direction as going toward the axially one side.

The inner diameter side flat surface portion 45 constitutes a side surface on the radially inner side of the inner surface of the notch 43, is arranged radially inner side from the center C (pitch circle P) of the pocket 42, and extends substantially linearly in the axial direction. The inner diameter side flat surface portion 45 is arranged so as to straddle the pitch circle P in the axial direction, and is slightly inclined in the radially-inward direction as going toward the axially one side. Therefore, the opening width of the notch 43 in the radial direction increases toward the axially one side.

The back side flat surface portion 46 constitutes a bottom surface of the inner surface of the notch 43, is arranged on the axially other side from the center C (pitch circle P) of the pocket 42, and extends linearly in the radial direction. The back side flat surface portion 46 is arranged substantially parallel to the side surface on the other side in the axial direction of the rim portion 40 so as to straddle the pitch circle P in the radial direction.

Of a pair of curved surfaces 47a, 47b, one curved surface 47a constitutes a corner portion on the radially outer side of the inner surface of the notch 43, and is curved in a concave cylindrical surface shape. The curved surface 47a is arranged so as to straddle the pitch circle P in the axial direction, and smoothly connects the end section on the axially other side of the outer diameter side flat surface portion 44 and the end section on the radially outer side of the back side flat surface portion 46. Of a pair of curved surfaces 47a, 47b, the other curved surface 47b constitutes a corner portion on the radially inner side of the inner surface of the notch 43, and is curved in a concave cylindrical surface shape. The curved surface 47b smoothly connects the end section on the axially other side of the inner diameter side flat surface portion 45 and the end section on the radially inner side of the back side flat surface portion 46. In this example, the radius of curvature of the curved surface 47a arranged on the radially outer side is larger than the radius of curvature of the curved surface 47b arranged on the radially inner side.

Since the circumferential distance between the balls 11 adjacent to each other in the circumferential direction is the smallest on the pitch circle P of the ball 11, the thickness in the circumferential direction of the pillar portion 41 is the thinnest at the portion where the pitch circle P of the ball 11 passes, assuming that the notches 43 are not provided, and the thickness increases as the distance from the portion where the pitch circle P passes increases toward the radially outer side and toward the radially inner side respectively, and the thickness increases as the distance from the portion where the pitch circle P passes increases toward the axially one side and toward the axially other side respectively.

Figure 6:
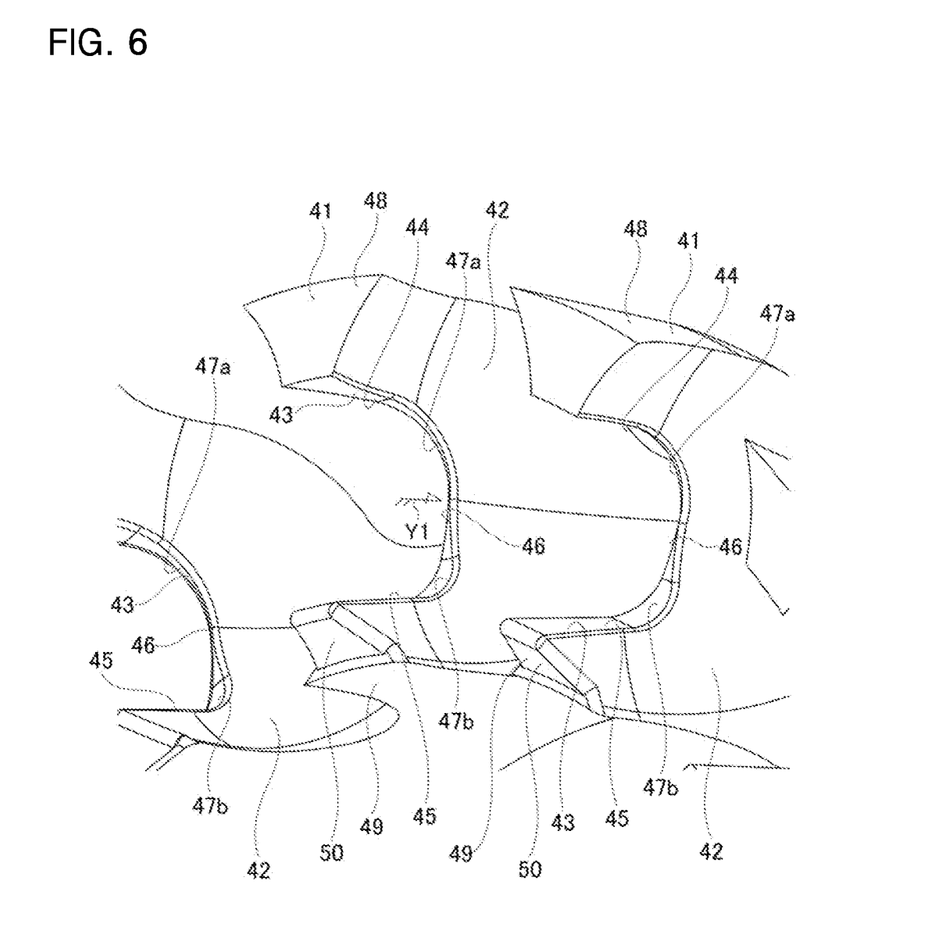
FIG. 6 is a partially enlarged perspective view illustrating a retainer for an angular contact ball bearing of the first example.
Figure 7:
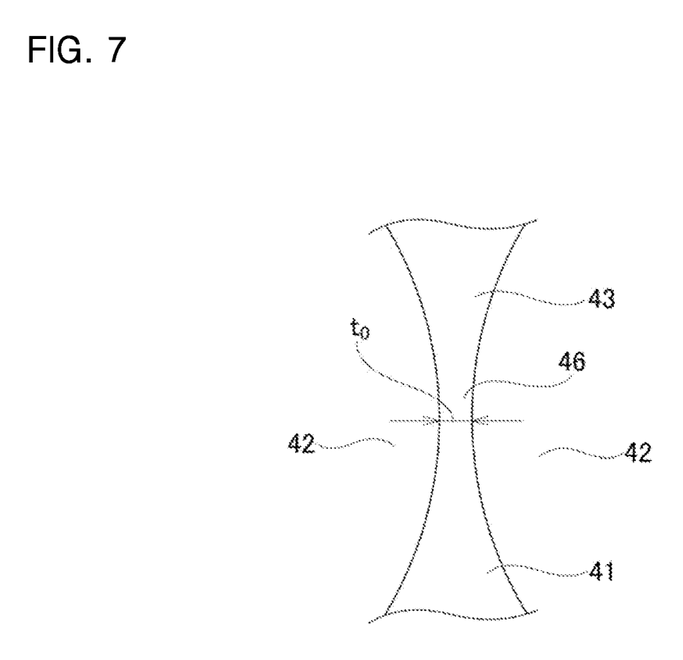
FIG. 7 is a schematic view corresponding to a view as seen from the arrow Y1 in FIG. 6.

Therefore, when the notch 43 having a substantially rectangular opening shape as seen from the circumferential direction is formed in a range of the pillar portion 41 from the end section on the axially one side to the axially intermediate section including the portion where the pitch circle P of the ball 11 passes, the shape of the back side flat surface portion 46 of the inner surface of the notch 43 becomes, as illustrated in FIG. 7 which corresponds to a view as seen from the arrow Y1 in FIG. 6, a constricted shape (substantially drum or hourglass shape) in which a pair of concave arcs (side surfaces in the circumferential direction of the pillar portions 41) face each other so as to bring each of the bottom portions closer. As a result, the thickness of the pillar portion 41 at the back side flat surface portion 46 becomes not constant in the length direction. Specifically, regarding the back side flat surface portion 46, the thickness in the intermediate section in the length direction is smaller than the thickness in both side portions in the length direction, thereby becomes the minimum thickness portion (thickness to) where the thickness in the circumferential direction of the pillar portion 41 is the smallest. That is, in this example, the minimum thickness portion in the circumferential direction of the pillar portion 41 is located in the intermediate section in the length direction of the back side flat surface portion 46.

When the balls 11 roll, the rolling contact surface of one of the balls 11 contacts the vicinity of the intermediate section in the length direction of the curved surface 47a, the inner diameter side flat surface portion 45, and the back side flat surface portion 46 of the side surface in the circumferential direction of the pillar portion 41 respectively, and especially the back side flat surface portion 46, which is the minimum thickness portion, is required to have strength and rigidity.

The pillar portion 41 is formed with a notch 43 in a range extending from the end section on the axially one side to the axially intermediate section so as to have an outer diameter side pillar piece 48 and an inner diameter side pillar piece 49 that are separated in the radial direction. The outer diameter side pillar piece 48 slightly protrudes to the axially one side than the inner diameter side pillar piece 49. The end section on the axially one side of the pillar piece 49 has a tapered shape such that the portion on the radially inner side is cut off in order to prevent interference with the inner-raceways 18a, 18b. The radially inner side surface of the end section on the axially one side of the pillar piece 49 is an inclined surface 50 inclined in a radially-outward direction as going toward the axially one side. The end section on the axially one side of the pillar piece 49 has a diameter larger than the inner diameter of the rim portion 40 and smaller than the outer diameter of the rim portion 40.

The retainer 12 for an angular contact ball bearing of this example can be manufactured by various injection molding methods known conventionally, but for example, it can be manufactured by injection molding by axial draw molding using a fixed side mold and a movable side mold.

In the retainer 12 for an angular contact ball bearing of this example, the circumferential distance between the pockets 42 adjacent to each other in the circumferential direction can be sufficiently shortened, and the number of balls 11 that can be held can be increased.

That is, in this example, the notch 43 having a substantially rectangular opening shape as seen from the circumferential direction is formed in a range of the pillar portion 41 from the end section on the axially one side to the axially intermediate section including the portion where the pitch circle P of the balls 11 passes. As a result, the shape of the back side flat surface portion 46 of the inner surface of the notch 43 can be a constricted shape in which the intermediate section in the length direction is narrower (thinner) than the both side portions in the length direction, and it is possible to position the minimum thickness portion in the circumferential direction of the pillar portion 41 in the intermediate section in the length direction of the back side flat surface portion 46.

When the retainer 12 for an angular contact ball bearing is manufactured by injection molding, portions having a small thickness solidify faster than portions having a large thickness. Therefore, the intermediate section in the length direction of the flat surface portions 46 on the back side, which is the minimum thickness portion of the pillar portion 41, solidify faster than the other portions of the pillar portion 41. Therefore, the intermediate section in the length direction of the back side flat surface portion 46 that solidified at an early stage is pulled in the length direction (radial direction) due to the shrinkage of both side portions in the length direction of the back side flat surface portion 46, so that the shape is adjusted. Specifically, the center line of the back side flat surface portion 46 becomes straight without wrinkles.

Due to the tensile stress remaining on the back side flat surface portion 46, the accuracy of the back side flat surface portion 46 can be improved, and the strength and rigidity of the peripheral edge portions of the back side flat surface portion 46 can be improved as well. Therefore, in this example, the thickness of the intermediate section in the length direction of the back side flat surface portion 46, which is the minimum thickness portion of the pillar portion 41, can be set to the minimum thickness ($t_0 < t_1$) required for injection molding. As a result, compared with a retainer for an angular contact ball bearing having a conventional structure as described in WO 2006/027342(A1), the circumferential distance between the pockets 42 (balls 11) adjacent to each other in the circumferential direction can be sufficiently shortened. Accordingly, the number of balls 11 that can be held by the retainers 12 for an angular contact ball bearing can be increased, and the basic dynamic load rating Cr of the hub unit bearing 8 can be improved.

The angular contact ball bearing of the present invention can be applied not only to the third-generation hub unit bearings, but it can also be applied to other generation hub unit bearings such as, for example, the first-generation hub unit bearings and the second-generation hub unit bearings. Further, the angular contact ball bearing of the present invention can be applied not only to hub unit bearings, but can be applied to single-row or double-row angular contact ball bearings incorporated in various mechanical devices.

REFERENCE SIGNS LIST

1 Retainer for an angular contact ball bearing
2 Rim portion
3 Pillar portion
4 Pocket
5 Ball
6 Notche
7 Curved surface
8 Hub unit bearing
9 Outer ring
10 Hub
11 Ball
12 Retainer for an angular contact ball bearing
13a, 13b Outer-raceway
14 Stationary flange
15 Support hole
16 Hub spindle
17 Inner ring
18a, 18b Inner-raceway
19 Shaft section
20 Rotating flange
21 Pilot section
22 Spline hole
23 Small diameter portion
24 Stepped surface
25 Swaged portion
26 Installation hole
27 Stud
28 Internal space
29 External space
30 Outer sealing member
31 Inner sealing member
32 Outer metal insert
33 Outer sealing member
34 Seal lip
35 Slinger
36 Seal ring
37 Metal insert
38 Seal member
39 Seal lip
40 Rim portion
41 Pillar portion
42 Pocket
43 Notch
44 Outer diameter side flat surface portion
45 Inner diameter side flat surface portion
46 Back side flat surface portion
47a, 47b Curved surface
48 Outer diameter side pillar piece
49 Inner diameter side pillar piece
50 Inclined surface

The invention claimed is:

1. A retainer for an angular contact ball bearing comprising:
an annular rim portion;
a plurality of pillar portions extending from a plurality of locations in a circumferential direction of the rim portion to an axially one side, each having concave curved side surfaces in the circumferential direction;
a plurality of pockets respectively defined by a portion surrounded on three sides by a pair of pillar portions adjacent to each other in the circumferential direction of the plurality of pillar portions and the rim portion; and the pillar portions respectively having a notch in a range extending from an end section on the axially one side to an axially intermediate section to communicate the pair of pockets adjacent to each other in the circumferential direction, wherein the notch has a rectangular, trapezoid, or trapezium opening shape as seen from the circumferential direction, and an inner surface of the notch has a radially outer side flat surface portion arranged on a radially outer side from a center of each of the pockets and extending substantially linearly in an axial direction, a radially inner side flat surface portion arranged on a radially inner side from the center of each of the pockets and extending substantially linearly in the axial direction, and a back side flat surface portion arranged on an axially other side from the center of each of the pockets and extending linearly in a radial direction, and wherein the back side flat surface portion has a constricted shape in which an intermediate section in a length direction thereof is narrower than both side portions in the length direction thereof.

2. An angular contact ball bearing comprising:
an outer ring member having an angular type outer-raceway on an inner circumferential surface;
an inner ring member having an angular type inner-raceway on an outer-circumferential surface;
a plurality of balls arranged between the outer-raceway and the inner-raceway; and
the retainer according to claim 1, of which the plurality of pockets hold the plurality of balls.

3. A hub unit bearing for supporting a wheel of an automobile with respect to a suspension device so as to be able to rotate freely, comprising:
a double-row angular contact ball bearing having:
an outer ring member having a double row of angular type outer-raceways on an inner circumferential surface;
an inner ring member having a double row of angular type inner-raceways on an outer-circumferential surface;
a plurality of balls arranged between the double row of outer-raceways and the double row of inner-raceways; and
the retainer according to claim 1 of which the plurality of pockets hold the plurality of balls, the retainer arranged respectively in between each of the double row of outer-raceways and the double row of inner-raceways.

\* \* \* \* \*